United States Patent [19]

Okumura

[11] Patent Number: 5,966,719
[45] Date of Patent: Oct. 12, 1999

[54] METHOD FOR INSERTING CAPITALIZED LATIN CHARACTERS IN A NON-LATIN DOCUMENT

[75] Inventor: Kaoru Okumura, Tokyo, Japan

[73] Assignee: Microsoft Corporation, Redmond, Wash.

[21] Appl. No.: 08/974,693

[22] Filed: Nov. 20, 1997

[51] Int. Cl.$^6$ .................................................. G06F 17/27
[52] U.S. Cl. .......................................................... 707/536
[58] Field of Search .................................... 707/536, 535, 707/532, 516; 400/484, 110, 112; 345/171, 172, 116

[56] References Cited

U.S. PATENT DOCUMENTS

| | | | |
|---|---|---|---|
| 5,321,801 | 6/1994 | Ando | 395/145 |
| 5,535,119 | 7/1996 | Ito et al. | 364/419.03 |
| 5,634,066 | 5/1997 | Takehara et al. | 395/797 |
| 5,634,134 | 5/1997 | Kumai et al. | 395/798 |

FOREIGN PATENT DOCUMENTS

| | | |
|---|---|---|
| 0 472 444 A2 | 2/1992 | European Pat. Off. . |
| 3248631 A1 | 7/1984 | Germany . |

OTHER PUBLICATIONS

Microsoft® IME97 for Windows® 95 Upgrade, pp. 38–39, ©1996 Microsoft Corp.

"How to Have Accelerator Keys Support Japanese and US Keyboards," from the Microsoft Technical Support Website, http://www.microsoft.com/kb/articles/q129/0/80.htm, Article ID #Q129080, last reviewed Apr. 19, 1995, pp. 1–2.

"Input Method Editor (IME) in Japanese Windows 3.1," from the Microsoft Technical Support Website, http://www.microsoft.com/kb/articles/q123/3/92.htm, Article ID #Q123392, last reviewed Jul. 23, 1997, pp. 1–2.

"Appendix E1: Far East Enabling: Input Method Editor (IME)," source unknown, 4 pages.

Kano, N., "Common IME Systems on Far East Windows 95," article adapted from *Developing International Software for Windows 95 and Windows NT* by Nadine Kano, Sep. 12, 1995, pp. 1–5.

Tamaru, K., "How to use Japanese IME (Input Method Editor)," Aug. 12, 1997, pp. 1–2.

*Primary Examiner*—Stephen S. Hong
*Assistant Examiner*—Alford W. Kindred
*Attorney, Agent, or Firm*—Jones & Askew, LLP

[57] ABSTRACT

Inserting capitalized Latin characters in a non-Latin document by changing the input mode of an input device, such as a keyboard, from a non-Latin input mode to a Latin input mode. The input mode is automatically switched from a non-Latin input mode to a Latin input mode when the combination of a shift key and an alphabet key on the input device is depressed. The input mode is automatically returned to the previous non-Latin input mode when the shift key is released and only an alphabet key on the input device is depressed.

21 Claims, 7 Drawing Sheets

| Keyboard Event | 410 Alphabet Key | 412 Shift + Alphabet Key | 414 non-Alphabet Key Only | 416 Shift + Alphabet Key | 418 Alphabet Key Only |
|---|---|---|---|---|---|
| Input Mode | non-Latin | Latin | Latin | Latin | non-Latin |

Fig. 4B

METHOD FOR INSERTING CAPITALIZED LATIN CHARACTERS IN A NON-LATIN DOCUMENT

FIELD OF THE INVENTION

This invention relates in general to using an input device to enter a document having Latin and non-Latin characters, and in particular to inserting capitalized Latin characters in a non-Latin document using a keyboard.

BACKGROUND OF THE INVENTION

Word processing programs are commonly used to create and edit documents. To create a document using a word processing program, an author typically enters the text of the document using a keyboard. For a language system having a limited number of alphabet characters, each alphabet character is assigned to a different key of the keyboard. For example, the English language system uses twenty-six alphabet characters. Most keyboards have approximately 101 keys, so each English language alphabet character is assigned to a different key. To enter a word, an author depresses the keys which correspond to the letters of the words of the document and the keystrokes are sent directly from the keyboard to the word processing program.

In contrast to the English language system, some language systems have significantly more characters than there are keys on a keyboard. For example, the Japanese language system uses approximately 6,300 kanji characters. Because the number of kanji characters precludes assigning each kanji character to a different key, a phonetic input method is used to enter a Japanese document. To use the phonetic input method, an author enters a combination of keys which correspond to the syllables of the kanji character. Typically, a front-end input processor converts the keystrokes into syllabic characters and then converts the syllabic characters into kanji characters.

A phonetic input method for a Japanese keyboard may convert combinations of Latin characters into kana characters. A kana character is a syllabic character. There are two commonly used sets of kana, Hiragana and Katakana. Each set includes 46 characters. For example, if an author enters "k" and then enters "a", the kana character corresponding to the syllable "ka" is displayed on the display device. Once the kana characters are entered, the kana characters may be converted into kanji characters by depressing a conversion key.

A Japanese document may include kana and kanji characters, as well as English language words or text strings. Typically, an author uses one input mode to enter kana and then manually switches to another input mode to enter an English language text string. The author's input rhythm is disrupted when the author must stop typing and switch to a different input mode to enter the English language text string. Once the English language text string is entered, the author's input rhythm is again disrupted when the author must stop typing to return to the previous non-Latin input mode.

One solution to the mode switching problem uses a dictionary. For example, the "ATOK 11" front-end input processor used with the "ICHITARO" word processing program, uses a dictionary of learned words. If an author enters a kana string corresponding to one of the learned words, then the learned word is converted to an English language text string when the conversion key is pressed. One drawback of the ATOK 11 solution is that it only works for learned words. If a word is not in the dictionary of learned words, then the word is not converted. Another drawback is that the kana string is not converted until the conversion key is depressed, so the English language characters are not immediately displayed. The delay in displaying the English language characters makes it difficult for an author to review a document as the document is entered. Yet another drawback is that a kana string may be converted incorrectly. For example, a kana character intended by the author to remain as a kana character (or to be converted into kanji) may be erroneously converted into English language characters or a kana character at a boundary of a kana string intended by the author to be converted may not be converted.

Another solution to the mode switching problem automatically detects the depression of the shift key. For example, the "IME '97" front-end input processor marketed by Microsoft Corporation of Redmond, Wash. detects the depression of the shift key in combination with an alphabet key and automatically switches into an input mode appropriate for entering a capitalized English language character. A disadvantage of the IME '97 method is that the input mode is not automatically returned to the previous mode once a capitalized English language text string is entered. To return to the previous input mode, the user must intervene. For example, the user may manually select the previous input mode or determine the previously entered text. To determine the previously entered text, the user typically depresses a character determination key, such as the enter key, to accept the displayed text.

Many of the English language text strings included in a Japanese document are capitalized. Capitalized terms include abbreviations, such as PC (personal computer), OS (operating system) or HTML (hypertext markup language). Although the IME '97 method switches input modes when the shift key is depressed in combination with an alphabet key, the IME '97 method does not return to the previous mode when only an alphabet key is depressed. If the input mode could be automatically returned to the previous mode, then the author's input rhythm would not be disrupted to return to the previous non-Latin input mode once an English language text string is entered.

Accordingly, there is a need in the art for a method for automatically switching input modes to enter a capitalized text string and then automatically returning to the previous input mode once the capitalized text string is entered.

SUMMARY OF THE INVENTION

The present invention meets the need described above by automatically detecting the depression of the shift key in combination with an alphabet key to switch into a Latin input mode and then automatically detecting the depression of an alphabet key only to return to the previous non-Latin input mode. The term Latin input mode refers to an input mode appropriate for entering Latin characters, such as English language characters, and the term non-Latin input mode refers to an input mode appropriate for entering non-Latin characters, such as kana characters. Latin is commonly used to refer to a collection of related characters which may be used to represent a particular language. For example, Latin characters may be used to represent the English, French or German language.

Typically, non-Latin characters are entered using a non-Latin input mode. To enter Latin characters, the input mode must be switched to a Latin input mode. The switch from the non-Latin input mode to the Latin input mode is triggered by the combination of the shift key and an alphabet key. Once the capitalized Latin text string is entered, the input mode is returned to the previous non-Latin input mode. The return to the previous input mode is triggered by the release of the shift key and the subsequent depression of an alphabet key.

The return to the previous non-Latin input mode may occur after the entry of a single capitalized Latin character. While in a non-Latin input mode, a keyboard event is detected. If the keyboard event is a combination of the shift key and an alphabet key, then the input mode is switched from the non-Latin input mode to a Latin input mode and the capitalized Latin character corresponding to the alphabet key is displayed. If the keyboard event is not a combination of the shift key and an alphabet key, then the input mode is not changed.

Once the input mode has been switched to the Latin input mode, another keyboard event is detected. The keyboard event is evaluated to determine whether the keyboard event corresponds to an alphabet key only or to a character determination key. If the keyboard event corresponds to an alphabet key only, then a syllabic character corresponding to the alphabet key is displayed and the input mode is returned to the saved non-Latin input mode. If the keyboard event corresponds to a character determination key, then the capitalized Latin character is determined and the input mode is returned to the saved non-Latin input mode. If the keyboard event does not correspond to an alphabet key only or to a character determination key, then a determination is made as to whether the keyboard event corresponds to a manual input mode selection. If so, then the input mode is switched to the selected input mode. If the keyboard event does not correspond to a manual input mode selection, then the input mode remains in the Latin input mode. The input mode remains in the Latin input mode until a keyboard event corresponding to an alphabet key only occurs, the previously entered text is determined or the input mode is manually changed.

In another aspect of the present invention, at least two capitalized Latin characters must be inserted before the input mode is returned to the previous non-Latin input mode. If only a single capitalized Latin character is inserted, then the input mode remains in the non-Latin input mode until the user manually selects another input mode or the previously entered text is determined. For this aspect, a keyboard event is detected in a non-Latin input mode and a determination is made as to whether the keyboard event is a combination of the shift key and an alphabet key. If the keyboard event is a combination of the shift key and an alphabet key, then the input mode is switched to a Latin input mode and a capitalized Latin character corresponding to the alphabet key is displayed. Otherwise, the input mode remains in the non-Latin input mode.

After the input mode is switched to the Latin input mode, another keyboard event is detected. If the keyboard event is a combination of the shift key and an alphabet key, then the capitalized Latin character corresponding to the alphabet key is displayed. After two capitalized Latin characters have been inserted, another keyboard event is detected. If the keyboard event corresponds to an alphabet key only or to a character determination key, then the input mode is returned to the previous non-Latin input mode. If the keyboard event does not correspond to an alphabet key only or to a character determination key, then the input mode remains in the Latin input mode until a keyboard event corresponding to an alphabet key only, a character determination key, or a manual input mode selection is detected.

If the keyboard event detected after the input mode is switched to the Latin input mode is a character determination key, then the input mode is returned to the previous input mode. If the keyboard event detected after the input mode is switched to the Latin input mode is an alphabet key only, then the input mode remains in the Latin input mode. The input mode remains in the Latin input mode until a keyboard event corresponding to a manual input mode selection or a character determination key is detected. If a manual input mode selection is detected, then the input mode is switched to the selected input mode. If a character determination key is detected, then the input mode is returned to the previous mode.

If the keyboard event detected after the input mode is switched to the Latin input mode is not a combination of the shift key and an alphabet key, a character determination key, or an alphabet key only, then the input mode remains in the Latin input mode. Subsequent keyboard events are evaluated to determine whether the keyboard events correspond to a combination of the shift key and an alphabet key, a character determination key, or an alphabet key only. If a subsequent keyboard event corresponds to a combination of the shift key and an alphabet key, a character determination key, or an alphabet key only, then the steps described above in connection with the keyboard event detected after the input mode is switched to the Latin input mode are followed.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

FIGS. 4A and 4B are block diagrams illustrating input mode switching in accordance with an embodiment of the present invention.

DETAILED DESCRIPTION

The present invention is directed to a method for inserting Latin characters in a non-Latin document. In one embodiment, the invention is incorporated into the "IME '98" front-end input processor marketed by Microsoft Corporation of Redmond, Wash. Briefly described, the method automatically switches input modes when the combination of the shift key and an alphabet key is depressed and then automatically returns to the previous mode when the shift key is released and only an alphabet key is depressed. The method may be used to insert a capitalized Latin text string into a Japanese document using a Japanese keyboard. Kana characters are entered using a non-Latin input mode. A Latin text string is entered by depressing the shift key in combination with successive alphabet keys. The combination of the shift key and the first alphabet key causes the input mode to automatically switch into a Latin input mode. Once the insertion of the Latin text string is completed, the input mode is returned to the previous non-Latin input mode by depressing only an alphabet key.

Exemplary Operating Environment

Figure 1:
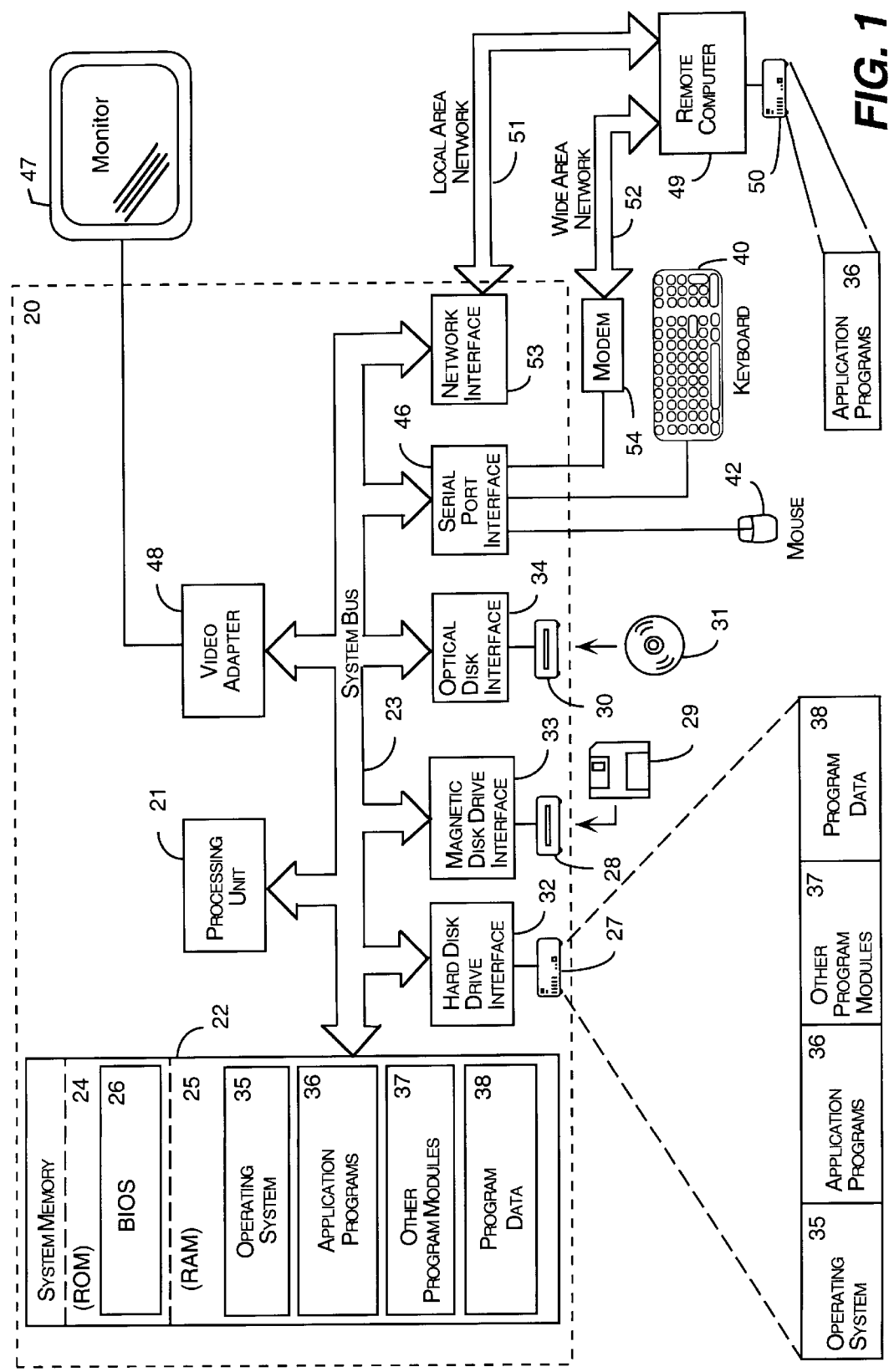
FIG. 1 is a block diagram of a personal computer illustrating the operating environment for an embodiment of the present invention.

FIG. 1 and the following discussion are intended to provide a brief, general description of a suitable computing environment in which the present invention may be implemented. While the invention will be described in the general context of a front-end input processor used in connection with an application program and an operating system running on a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, including a front-end input processor 37a, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a hard disk drive 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Japanese Keyboard

The present invention may be used with an input device, such as a Japanese keyboard, to enter a capitalized Latin text string in a Japanese document. The keys of a Japanese keyboard contain two character designations, one Latin character (a, b, c, etc.) designation and one kana character designation. The active character designation is controlled by the keyboard input method. There are two keyboard input methods, the Roman method and the kana method. In the Roman method, the Latin character is active. In the kana method, the kana character is active. The keyboard input method is user-selectable, typically via a toolbar or drop-down menu.

Both input methods support five possible input modes: (1) double byte Hiragana, (2) double byte Katakana, (3) double byte alphanumeric, (4) single byte Katakana, and (5) single byte alphanumeric. The input mode is user-selectable, typically by selecting the input mode from a drop-down menu. Modes (1), (2) and (4) are non-Latin input modes. In the non-Latin input modes, when Latin characters are typed, the Latin characters may briefly appear on the display, but are quickly converted to kana. For example, if the double byte Hiragana input mode is selected, when a user types "k" the "k" appears on the display, then when the user types "a", the "k" is replaced by the Hiragana character corresponding to the syllable "ka". Modes (3) and (5) are Latin input modes. In the Latin input modes, when a Latin character is typed, the Latin character appears on the display.

In the kana method, when a user types a kana character, the kana character appears on the display device. Once kana characters are entered using either the kana method or the Roman method, the kana characters may be converted to kanji characters. Generally, a Latin character is not affected by the kana to kanji conversion. The kana characters may be converted to kanji by depressing the conversion key. In certain embodiments, a key other than the conversion key may be used to initiate a conversion. Alternatively, if the automatic conversion mode is enabled, the conversion takes place as soon as a kana string is recognized as a legitimate phrase. Once the kana is converted, the user must review the converted string to verify the accuracy of the kanji conversion.

Characters are considered undetermined when they are initially entered by a user. Characters become determined once the user confirms that the characters are properly entered. Typically, a user determines the displayed character(s) by depressing the enter key. A user may determine a Latin character, a kana character, or a kanji character. For example, if a user intends to enter the abbreviation "OS", then the user may type "OS" using a Latin mode and then depress the enter key to determine the characters. If the user intends to enter a kanji character, then the user does not depress the enter key until after the typed character(s) is converted into a kanji character. Once the user determines the character(s), the character(s) can no longer be converted.

Input Mode Switching

Typically, non-Latin characters are entered using a non-Latin input mode, such as the double byte Hiragana input mode, and Latin characters are entered using a Latin input mode, such as the double byte alphanumeric mode. The present invention detects keyboard events corresponding to the insertion of a capitalized Latin text string and automatically switches input modes. The switch from the non-Latin input mode to the Latin input mode can be triggered by the combination of the shift key and an alphabet key. The combination of the shift key and an alphabet key is an appropriate trigger because the shift key is not used in the non-Latin input modes. Once the capitalized Latin text string is entered, the input mode is returned to the previous non-Latin input mode. The return to the previous input mode is triggered by the release of the shift key and the subsequent depression of an alphabet key only. Some embodiments may condition the return to the previous input mode on the occurrence of certain intervening keyboard events. For example, one embodiment requires that a second keyboard event corresponding to the combination of the shift key and an alphabet key occur before the alphabet key only. Although the term shift key is used herein, in certain embodiments, the term may include both the shift key and the caps lock key.

FIG. 2 and FIGS. 3A, 3B and 3C illustrate the steps for two different mode switching embodiments. The embodiment illustrated by FIG. 2 places no conditions on the return to the previous non-Latin input mode. In contrast, the embodiment illustrated by FIGS. 3A, 3B and 3C requires that at least two capitalized Latin characters be entered before the mode is returned to the previous non-Latin input mode.

Figure 2:
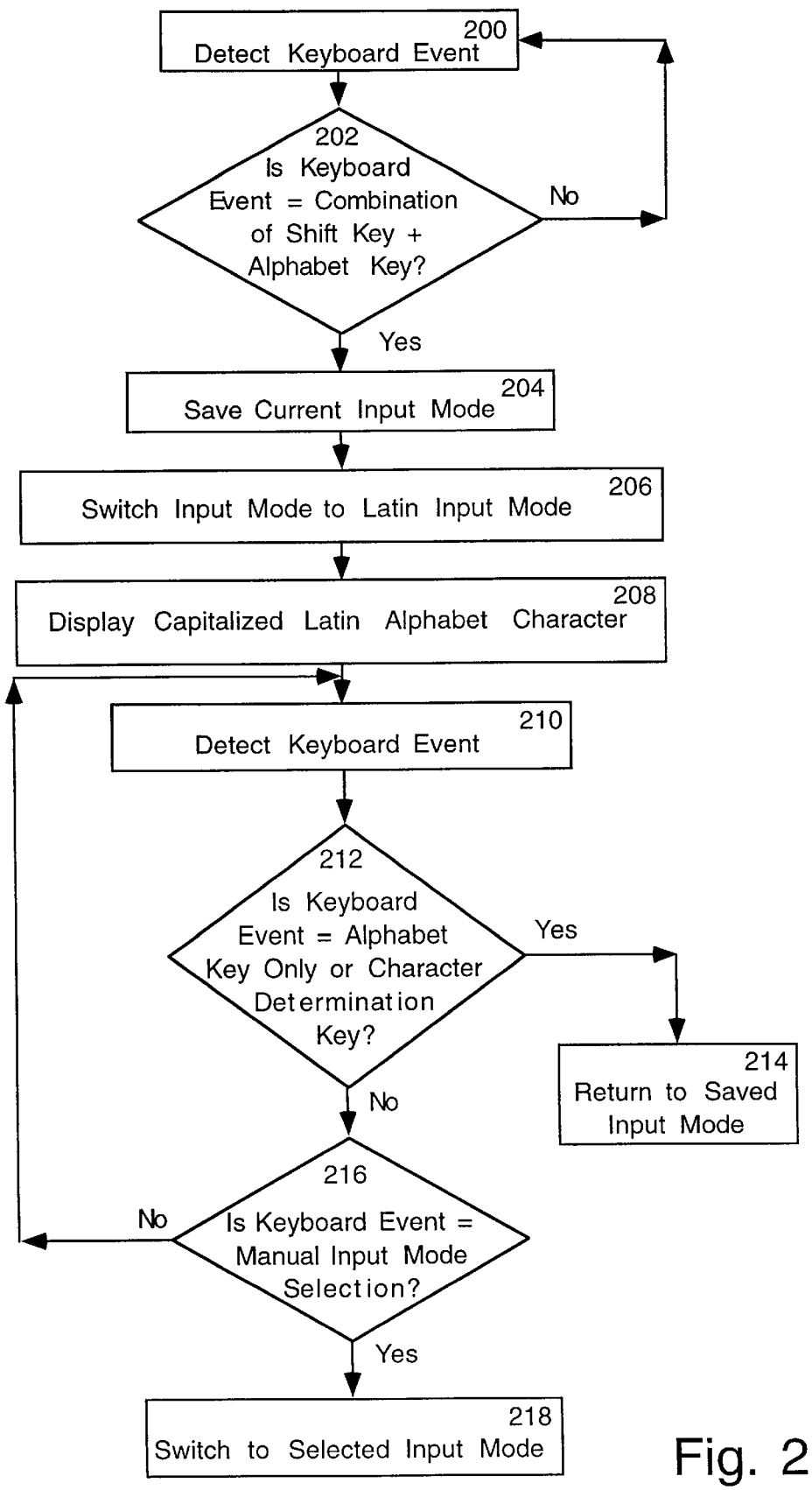
FIG. 2 is a flow diagram illustrating the steps for switching input modes for an embodiment of the present invention.

In FIG. 2, the initial input mode is a non-Latin input mode. A keyboard event is detected in step 200. If the keyboard event is a combination of the shift key and an alphabet key, then the method follows the yes branch from step 202 to step 204. If the keyboard event is not a combination of the shift key and an alphabet key, then the no branch is followed from step 202 back to step 200. In step 204, the current non-Latin input mode is saved. Once the non-Latin input mode is saved, the input mode is switched from the non-Latin input mode to a Latin input mode in step 206. In step 208, the capitalized Latin character corresponding to the alphabet key detected in step 200 is displayed.

Another keyboard event is detected in step 210. In step 212, a determination is made as to whether the keyboard event detected in step 210 is an alphabet key only or a character determination key. If the keyboard event is an alphabet key only or a character determination key, then the yes branch is followed from step 212 to step 214 and the input mode is returned to the saved non-Latin input mode. If the keyboard event is not an alphabet key only or a character determination key, then the no branch is followed from step 212 to step 216. In step 216 a determination is made as to whether the keyboard event corresponds to a manual input mode selection. If the keyboard event corresponds to a manual input mode selection, then the yes branch is followed to step 218 and the input mode is switched to the selected input mode. If the keyboard event does not correspond to a manual input mode selection, then the input mode remains in the Latin input mode and the no branch is followed back to step 210. The input mode remains in the Latin input mode until an alphabet only key, a character determination key or a manual input mode selection is detected. Once the input mode has been changed in either step 214 or step 218, the steps illustrated by FIG. 2 may be repeated. In this manner, several non-contiguous capitalized Latin characters may be entered.

Figure 3A:
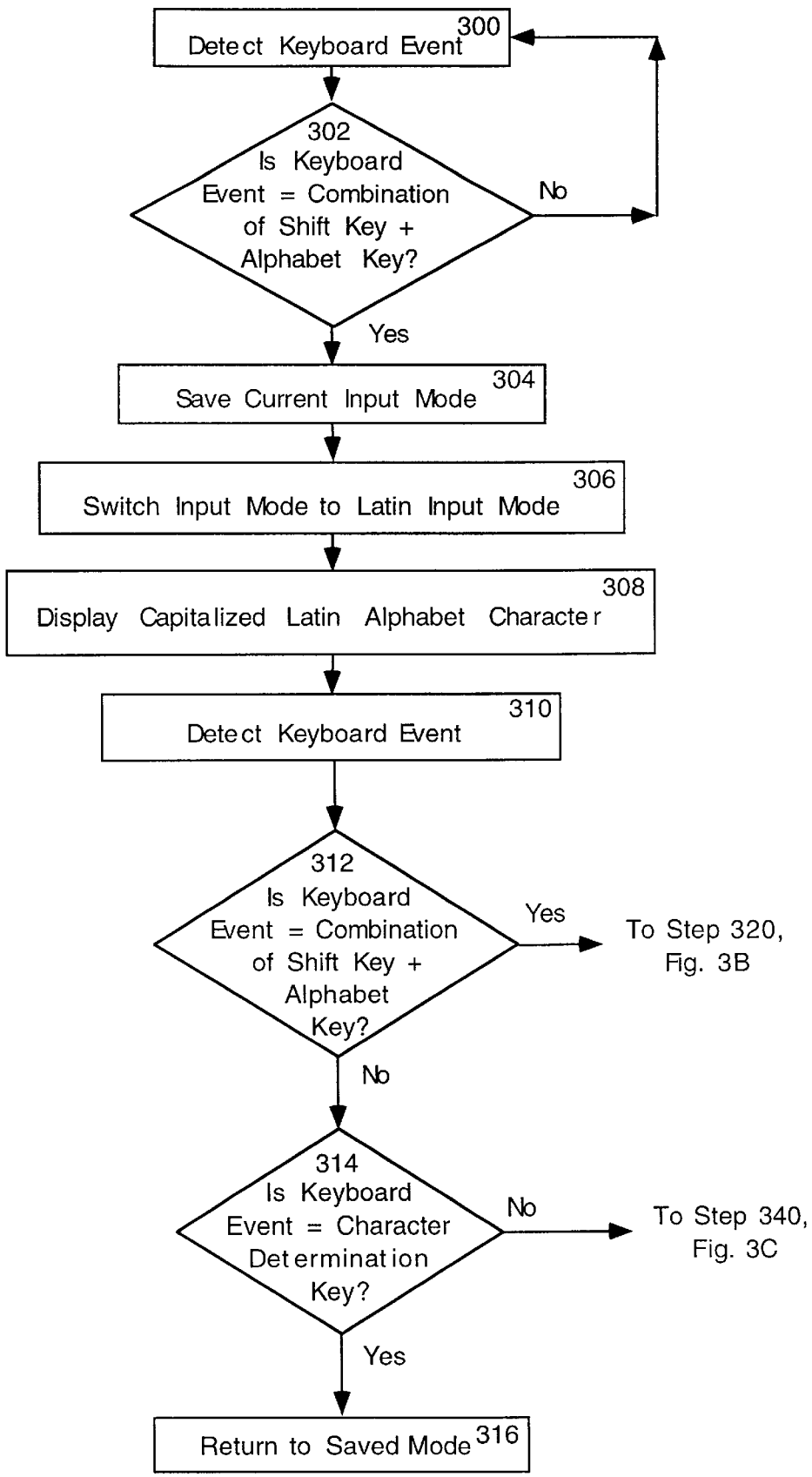
FIGS. 3A, 3B and 3C are flow diagrams illustrating the steps for switching input modes for another embodiment of the present invention.
Figure 3B:
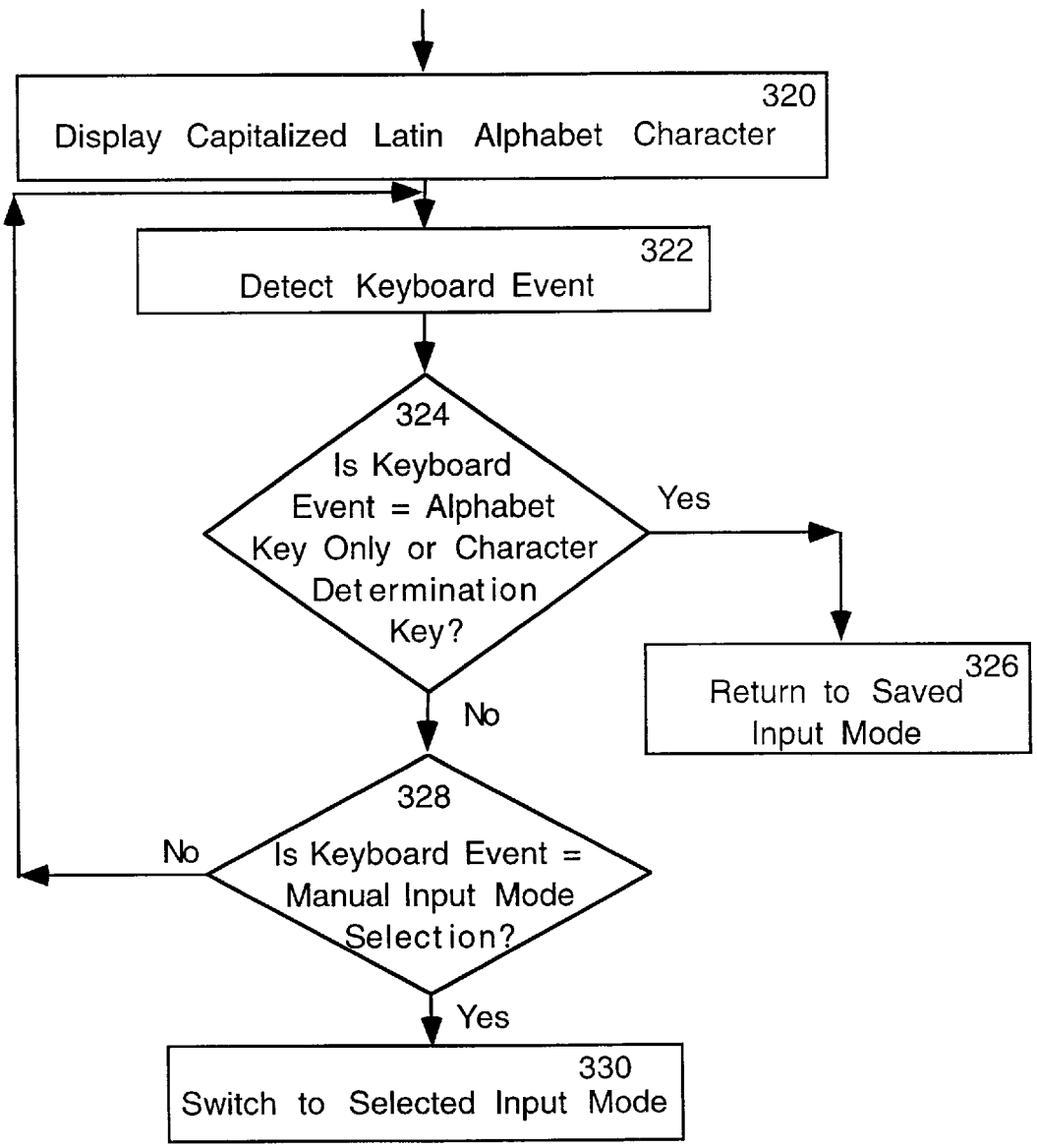
Figure 3C:
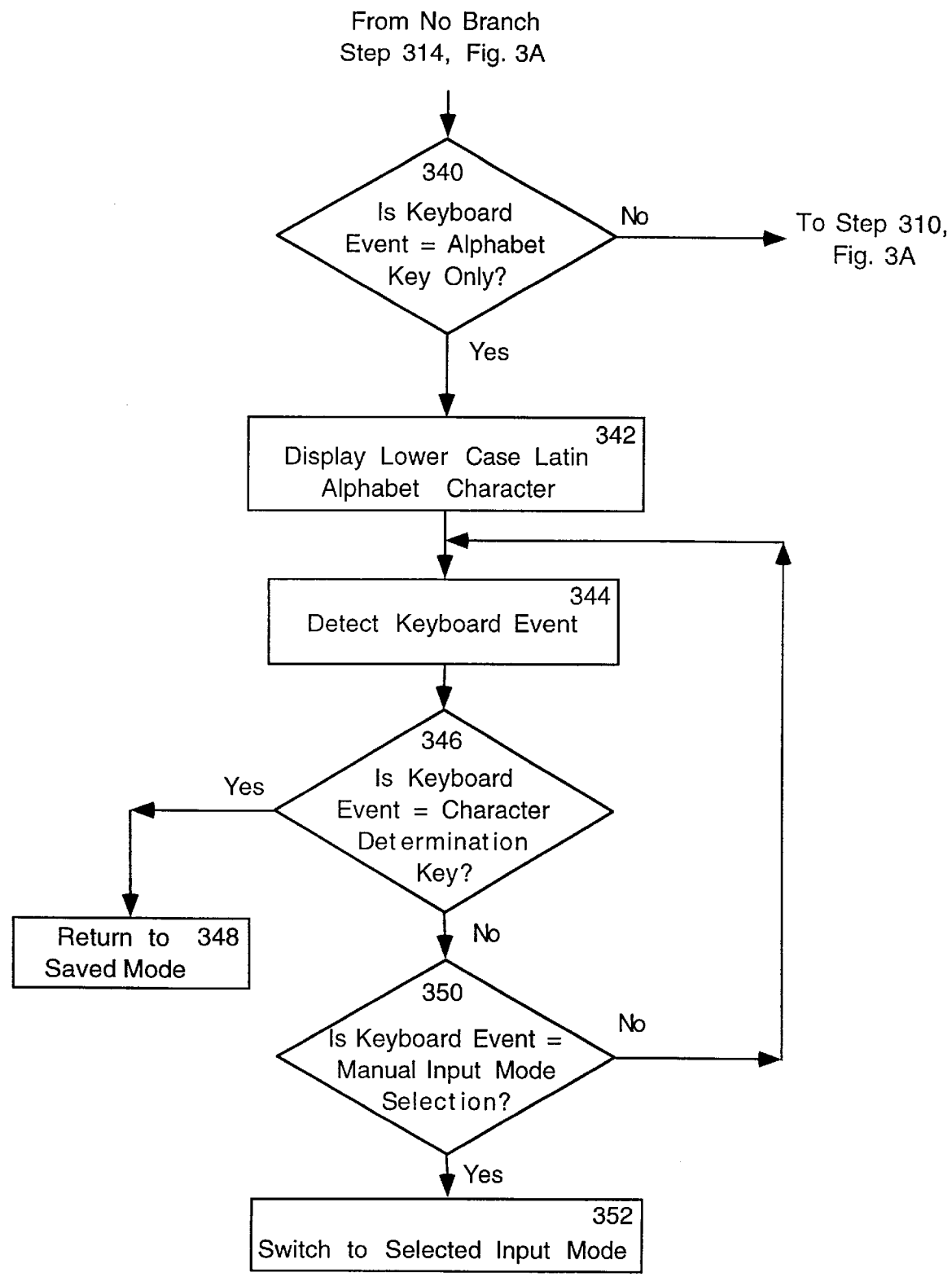

The embodiment illustrated by FIGS. 3A, 3B and 3C requires that at least two capitalized Latin characters be inserted before the input mode is returned to the previous non-Latin input mode. If only a single capitalized Latin character is inserted, then the user must manually return to the previous non-Latin input mode by selecting the previous input mode or by determining the characters. The input mode is in a non-Latin input mode when a keyboard event is detected in step 300. In step 302, a determination is made as to whether the keyboard event is a combination of the shift key and an alphabet key. If the keyboard event is a combination of the shift key and an alphabet key, then the method proceeds to step 304. If the keyboard event is not a combination of the shift key and an alphabet key, then the no branch is followed back to step 300. In step 304, the current non-Latin input mode is saved. Once the non-Latin input mode is saved, then the input mode is switched to a Latin input mode in step 306. In step 308, a capitalized Latin character corresponding to the alphabet key detected in step 300 is displayed.

In step 310, another keyboard event is detected. In step 312, the keyboard event detected in step 310 is analyzed to determine whether the keyboard event is a combination of the shift key and an alphabet key. If the keyboard event is a combination of the shift key and an alphabet key, then two capitalized Latin characters have been inserted and the method follows the yes branch to step 320 of FIG. 3B. In step 320, a capitalized Latin character corresponding to the alphabet key detected in step 310 is displayed. The method proceeds from step 320 to step 322 where another keyboard event is detected. If the keyboard event is an alphabet key only or a character determination key, then the method follows the yes branch from step 324 to step 326. In step 326, the method returns to the saved non-Latin input mode. However, if the keyboard event is not an alphabet key only or a character determination key, then the method follows the no branch to step 328. In step 328, a determination is made as to whether the keyboard event corresponds to a manual input mode selection. If the keyboard event corresponds to a manual input mode selection, then the yes branch is followed to step 330 and the input mode is switched to the selected input mode. If the keyboard event does not correspond to a manual input mode selection, then the no branch is followed back to step 322. The input mode remains in the Latin input mode until a keyboard event corresponding to an alphabet key only, a character determination key or a manual input mode selection occurs.

If the determination in step 312 is that the keyboard event detected in step 310 is not a combination of the shift key and an alphabet key, then the method proceeds to step 314. In step 314, a determination is made as to whether the keyboard event detected in step 310 corresponds to a character determination key. If the keyboard event corresponds to a character determination key, then the method proceeds to step 316 and the input mode is returned to the saved input mode. If the keyboard event does not correspond to a character determination key, then the no branch is followed to step 340 of FIG. 3C. In step 340, a determination is made as to whether the keyboard event detected in step 310 is an alphabet key only. If the keyboard event is an alphabet key only, then the input mode remains in the Latin input mode because only a single capitalized Latin character has been inserted, and the yes branch is followed to step 342. In step 342, a lower case Latin alphabet character corresponding to the alphabet key detected in step 310 is displayed. Another keyboard event is detected in step 344. If the keyboard event detected in step 344 corresponds to a character determination key, then the yes branch is followed to step 348 and the input mode is returned to the saved input mode. If the keyboard event does not correspond to a character determination key, then the no branch is followed to step 350. In step 350, a determination is made as to whether the keyboard event detected in step 344 corresponds to a manual input mode selection. If the keystroke corresponds to a manual input mode selection, then the yes branch is followed from step 350 to step 352 and the input mode is switched to the selected input mode. If the keyboard event does not correspond to a manual input mode selection, then the no branch is followed from step 350 to step 344. The input mode remains in the Latin input mode until the characters are determined or the input mode is manually changed.

If the keyboard event detected in step 310 is neither a combination of the shift key and an alphabet key, a character determination key, or an alphabet key only, then the input mode remains in the Latin input mode and the no branch is followed from step 340 to step 310. For example, if the keyboard event detected in step 310 is a shifted or unshifted non-alphabet key, then the loop including steps 310, 312, 314 and 340 is followed.

In both the embodiment illustrated by FIG. 2 and the embodiment illustrated by FIGS. 3A, 3B and 3C, the detection of a keyboard event comprising a shifted or an unshifted non-alphabet key does not affect the current input mode. For example, the depression of the "5" key or the combination of the shift key and the "5" key in either a non-Latin input mode or a Latin input mode, does not cause the input mode to switch. The depression of the "5" key causes the number "5" to be displayed and the depression of the combination of the shift key and the "5" key causes the symbol "%" to be displayed.

Figure 4A:
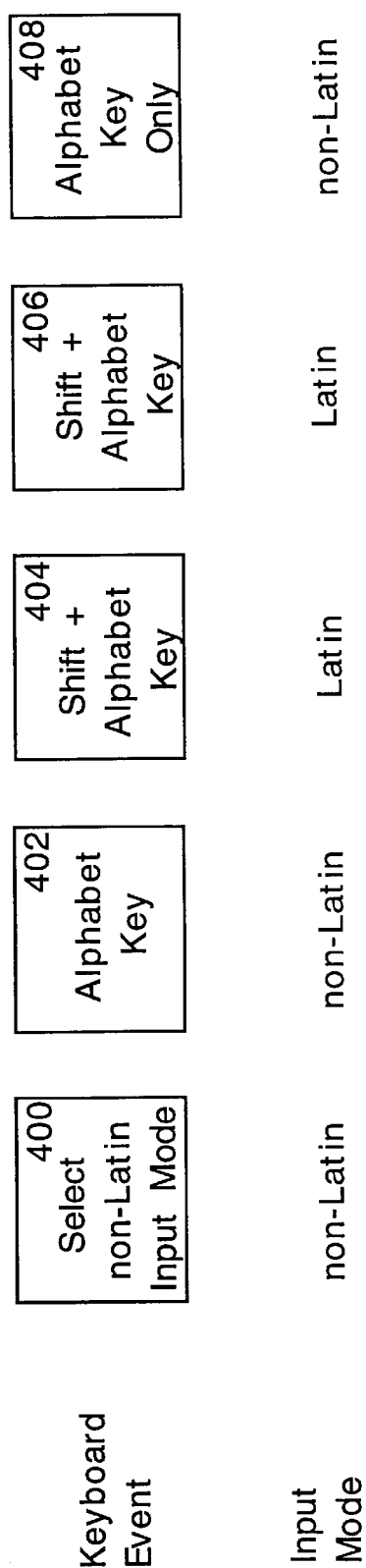

FIGS. 4A and 4B illustrate the effect of different keyboard events on the input mode of the keyboard. The examples provided by FIGS. 4A and 4B are applicable to both the embodiment illustrated by FIG. 2 and the embodiment illustrated by FIGS. 3A, 3B and 3C. In FIG. 4A, keyboard event 400 corresponds to the user manually selecting a non-Latin input mode. In response to the selection of a non-Latin input mode, the input mode is switched into the selected non-Latin input mode. Subsequently, the user enters an alphabet key at keyboard event 402 and the input mode remains in the non-Latin input mode. At keyboard event 404, a user depresses the shift key in combination with an alphabet key. In response to detecting the shift key in combination with the alphabet key, the input mode is switched from the non-Latin input mode to a Latin input mode. Another keyboard event including the shift key in combination with the alphabet key occurs at keyboard event 406 and the input mode remains in the Latin input mode. Subsequently, the user enters an alphabet key only at keyboard event 408. Detecting an alphabet key only while in the Latin input mode causes the input mode to return to the previous non-Latin input mode.

FIG. 4B further illustrates input mode switching. FIG. 4B assumes that the user has previously selected a non-Latin input mode. At keyboard event 410, the user enters an alphabet key and the input mode remains in the non-Latin input mode. Subsequently, the user enters the combination of the shift key and an alphabet key at keyboard event 412. The combination of the shift key and the alphabet key triggers an input mode switch to a Latin input mode. At keyboard event 414, the user enters a non-alphabet key only. The entry of the non-alphabet key does not cause an input mode switch and the input mode remains in the Latin input mode. At keyboard event 416, the user enters the combination of the shift key plus an alphabet key. Again, the mode remains in Latin input mode. The mode does not switch back to the previous non-Latin input mode until an alphabet key only keyboard event is detected, such as keyboard event 418.

Although the present invention has been described using the Roman method of a Japanese keyboard, those skilled in the art will realize that the present invention may also be used in the kana method since the shift key is not used to enter kana characters. The steps for a method using the kana method are similar to those described in connection with FIG. 2 and FIGS. 3A, 3B and 3C. Those skilled in the art will also realize that a key other than the shift key or the caps lock key may be defined for use in connection with the present invention. The key would preferably be a key which is not used to enter kana characters. Finally, the present invention is not limited to a Japanese keyboard. An English keyboard or even another type of input device may be used.

In summary, the present invention is directed toward a method for inserting capitalized Latin characters in a non-Latin document. Although the present invention has been described in connection with inserting a capitalized Latin text string in a Japanese document, the invention also applies to the insertion of foreign language text strings in other ideographic language systems. Alternative embodiments will become apparent to those skilled in the art to which the present invention pertains without departing from its spirit and scope. Accordingly, the scope of the present invention is described by the appended claims and is supported by the foregoing, description.

What is claimed is:

1. A method for switching from a non-Latin input mode into a Latin input mode using an input device having a shift key and a plurality of alphabet keys, comprising the steps of:
   in the non-Latin input mode, detecting a first shifted alphabet keystroke event comprising a combination of the shift key and one of the plurality of alphabet keys;
   switching into the Latin input mode;
   displaying a first capitalized Latin character corresponding to the first shifted keystroke event on a display device;
   detecting a second shifted alphabet keystroke event comprising a combination of the shift key and one of the plurality of alphabet keys;
   detecting an alphabet keystroke event comprising only one of the plurality of alphabet keys; and
   switching into the non-Latin input mode.

2. The method of claim 1, further comprising the step of:
   displaying a second capitalized Latin character corresponding to the second shifted alphabet keystroke event on the display device.

3. The method of claim 1, further comprising the step of:
displaying a syllabic character corresponding to the alphabet keystroke event on a display device.

4. The method of claim 1, wherein the input device also has a plurality of non-alphabet keys, and wherein detecting a shifted non-alphabet keystroke event comprising a combination of the shift key and one of the plurality of non-alphabet keys does not cause an input mode switch.

5. A method for inserting a capitalized Latin character in a non-Latin document using an input device having a plurality of alphabet keys comprising the steps of:
entering a first plurality of non-Latin characters by:
selecting a non-Latin input mode; and
depressing successive ones of the alphabet keys;
inserting a capitalized Latin character by:
depressing a predefined key in combination with one of the plurality of alphabet keys to automatically switch to a Latin input mode;
entering a second plurality of non-Latin character by:
depressing one of the plurality of alphabet keys without depressing the predefined key to automatically return to the non-Latin input mode; and
depressing another one of the plurality of alphabet keys.

6. The method of claim 5, wherein another capitalized Latin character may be inserted in the Latin input mode by repeating the step of:
depressing the predefined key in combination with one of the plurality of alphabet keys.

7. The method of claim 5, wherein the non-Latin input mode is an input mode for inputting kana characters.

8. The method of claim 7, wherein the first plurality of non-Latin characters and the second plurality of non-Latin characters are displayed as kana characters and the capitalized Latin character is displayed as a capitalized Latin character.

9. The method of claim 7, wherein the input device includes a conversion key for initiating a conversion of the kana characters to kanji characters, and wherein depressing the conversion key converts the kana characters to kanji characters, but does not convert the capitalized Latin character.

10. The method of claim 5, wherein the input device has a plurality of non-alphabet keys and depressing the predefined key in combination with one of the plurality of non-alphabet keys does not change the input mode.

11. A computer-readable medium having computer-executable instructions comprising the steps of:
in a non-Latin input mode, detecting a first keystroke event comprising a combination of a predefined key and one of a plurality of alphabet keys;
switching into a Latin input mode;
displaying a capitalized Latin character corresponding to the first keystroke event; and
detecting a subsequent keystroke event comprising only one of the plurality of alphabet keys; and
returning to the non-Latin input mode.

12. The computer-readable medium of claim 11, wherein a syllabic character corresponding to the subsequent keystroke event is displayed on a display device.

13. The computer-readable medium of claim 11, having further computer executable instructions comprising:
detecting a second keystroke event comprising a combination of the predefined key and one of the plurality of alphabet keys before detecting the subsequent keystroke event.

14. The computer-readable medium of claim 11, having further computer executable instructions comprising:
in the non-Latin input mode, detecting a non-alphabet keystroke event comprising a combination of the predefined key and one of a plurality of non-alphabet keys; and
remaining in the non-Latin input mode.

15. The computer-readable medium of claim 11, having further computer executable instructions comprising:
in the Latin input mode, detecting a non-alphabet keystroke event comprising one of a plurality of non-alphabet keys; and
remaining in the Latin input mode.

16. A method for automatically switching from a non-Latin input mode into a Latin input mode using a keyboard having a shift key and a plurality of alphabet keys, comprising the steps of:
detecting a shifted alphabet keyboard event comprising a combination of a shift key and one of the alphabet keys, and
if in the Latin input mode, then remaining in the Latin input mode and inserting a capitalized Latin character corresponding to the shifted alphabet keyboard event;
otherwise, saving the non-Latin input mode, switching to the Latin input mode, and inserting a capitalized Latin character corresponding to the shifted alphabet keyboard event; and
detecting an alphabet keyboard event comprising only one of the alphabet keys, and if in a Latin input mode, then returning to the saved non-Latin input mode; otherwise, remaining in the non-Latin input mode.

17. The method of claim 16, wherein the shifted alphabet keyboard event comprises a combination of the shift key and a selected one of the alphabet keys.

18. The method of claim 16, wherein the alphabet keyboard event comprises only a selected one of the alphabet keys, and wherein a syllabic character corresponding to the selected alphabet key is displayed in response to detecting the alphabet keyboard event.

19. The method of claim 16, wherein the keyboard further comprises a plurality of non-alphabet keys, further comprising the steps of:
detecting a shifted non-alphabet keyboard event comprising a combination of the shift key and a selected one of the non-alphabet keys;
remaining in a current input mode; and
displaying a non-alphabet character corresponding to the shifted selected non-alphabet key.

20. The method of claim 16, wherein the keyboard further comprises a plurality of non-alphabet keys, further comprising the steps of:
detecting a non-alphabet keyboard event comprising only a selected one of the non-alphabet keys;
remaining in a current input mode; and
displaying a non-alphabet character corresponding to the selected non-alphabet key.

21. The method of claim 16, wherein two shifted alphabet keyboard events occur before the alphabet keyboard event causes a return to the saved non-Latin input mode.

* * * * *